3,840,676
BINDING FOODSTUFFS WITH A PROLAMIN AND
AN α-AMINO ACID
Atsushi Yamamoto and Toshio Ikemoto, Tokyo, and Reiko Shimizu, Yokohama, Japan, assignors to Kyowa Hakko Kogyo Co., Ltd., Tokyo, Japan
No Drawing. Filed Nov. 19, 1971, Ser. No. 200,578
Claims priority, application Japan, Dec. 11, 1970, 45/109,333
Int. Cl. A23b 3/14, 7/00; A23l 1/00
U.S. Cl. 426—89    5 Claims

ABSTRACT OF THE DISCLOSURE

A method for processing foods with prolamins and α-amino acids. Foodstuffs are coated with a mixture of prolamin and an α-amino acid. The resulting film protects the foodstuff against oxidation and putrefaction.

---

This invention relates to a method for processing foods using prolamins and amino acids.

Prior to the present invention, compounds like alginic acid, casein, polyphosphoric acid, polyacrylic acid and carboxymethylcellulose have been used as coating agents in processing foods. However, the use of these coating agents does not always result in a coating which is resistant to oxidation, moisture, putrefaction, etc.

Similar compounds of higher molecular weight have also been used in binding food components. However, in some cases, the binding produced is weak and these compounds are not particularly suitable for binding components containing a high percentage of water.

According to the present invention, the coating and binding of foods is accomplished with relative ease by utilizing a specific effect which results from the combined use of prolamins and amino acids.

Prolamins are proteins which are found in grains. For example, gliadin, zein, rice-gliadin and kafirin are obtained respectively from wheat, corn, rice and kafir by extraction with aqueous alcohol or slightly acidic or alkaline aqueous solutions. The prolamins are insoluble in water and show remarkably high viscosity when dissolved in alcohol or alcoholic solutions. On the other hand, ampholytes are amino acids which can be produced at a low cost by fermentation. When prolamin is contacted with an amino acid under aqueous conditions, a highly complex gelantinous mixture is formed.

The characteristic feature of the present invention lies in providing a method for processing foods whereby a highly viscous prolamin is converted into a highly elastic body by contacting it with an amino acid. The elastic complex formed is used to coat and bind the foodstuff.

The process of the present invention is carried out according to the following method. A prolamin is dissolved or converted into a homogeneously emulsified suspension in a 20 to 80% aqueous alcohol solution or dissolved in an organic acid solution having a pH of about 2 to 6. The material to be coated is first dipped into the prolamin solution or suspension and then into an aqueous or aqueous alcoholic solution of an amino acid. Alternatively, the dipping into the amino acid solution may be carried out in advance of the dipping into the prolamin solution. In other words, the order of the dipping is optional. The coated material is then dried at room temperature or elevated temperatures to remove the solvent and settle the coating. Generally, temperatures ranging from 70 to 150° C. may be employed for the drying step. As a result of this treatment, a glossy thin film is formed on the surface of the material.

Alcohols such as ethanol, methanol, and propanol may be used as the solvent. Where the amino acid or prolamin is only slightly soluble in the solvent, a suspension of the reactant may be employed. When an organic acid solution is used as the solvent carrier, organic acids such as citric acid, malic acid, ascorbic acid, acetic acid, etc. may be employed.

Generally, the material to be coated is immersed in the solution or suspension of the prolamin or amino acid for relatively short periods. Generally, periods from a few seconds to several minutes are suitable to provide a smooth coating. The exact length of time employed will depend upon the carrier and particular prolamin or amino acid employed. Best results are obtained when the material to be coated is removed almost immediately from the prolamin and amino acid solutions.

The film is effective in preserving foodstuffs against oxidation and putrefaction as well as in maintaining freshness by preventing exposure of the foodstuff to air and moisture.

In carrying out the present process, coating can be effected not only by dipping the foodstuffs as described above, but also by brushing or spraying. Any of these methods may be employed as long as a uniform coating is applied over the surface of the materials to be coated. A single application using a single solution containing a prolamin and an amino acid is also effective. However, when such a solution is employed, the film formed is inevitably thin, and it may be necessary to repeat the application several times depending upon the materials to be coated. This is due to the fact that a coating mixture of low concentration is employed to avoid gelling of the mixture.

When an organic acid solution of a prolamin is used, the pH of the foodstuff and that of the amino acid solution must be carefully observed since the formation of film occurs quickly in a neutral or slightly alkaline state. The preferred pH for the formation of film ranges from 6 to 9. If necessary, pH may be adjusted with an aqueous solution of sodium hydroxide.

Amino acids which can be employed in the present invention are generally basic amino acids and inorganic and organic acid salts thereof such as hydrochloride, acetate, etc., neutral amino acids and alkali metal salts of acidic amino acids. Examples of suitable amino acids are the naturally occurring α-amino acids L-lysine, L-arginine, L-histidine, glycine, L-alanine, L-valine, L-leucine, L-isoleucine, L-serine, L-threonine, L-cysteine, L-methionine, L-phenylalanine, L-tyrosine, L-tryptophan, L-proline, L-hydroxyproline, L-aspartic acid and L-glutamic acid.

In addition, a filler, a coloring agent, a flavoring agent, and the like may be added to the coating solution.

The process of the present invention can also be used for binding foodstuffs. When the food components to be bound are relatively small granules, a prolamin and an amino acid are generally simultaneously added to the granules and the mixture is kneaded and dried. In cases where it is desirable to preserve the shape of the material to be bound, binding can be effected by applying a prolamin solution and an amino acid solution followed by joining and drying as in the case where a coating is applied. Pressing or addition of an oxidizing agent can accelerate the binding reaction; this also results in a strong binding in a shorter period. Oxidizing agents such as hydrogen peroxide can be used as accelerators for the binding reaction.

As in the case of coating, binding is also based on the high gelation reaction and the solutions are prepared in the same manner. The binding process, according to the method of the present invention, has the advantage that strong binding can be effected and, in addition, it may be employed with foodstuffs having a high water content.

Since naturally occurring proteins and amino acids which are edible are used in both the binding and coating steps, even if the coating materials of the present invention are used in large amounts, they are entirely safe for human consumption and do not spoil the taste or the flavor of the foods. Since the gelation reaction between a prolamin and an amino acid is utilized, the treatments can be carried out under mild conditions without changing the quality of the foodstuffs. The method of the present invention is based on the solidification resulting from denaturation of protein which results in a strong coating or binding effect which finds application in the coating and binding of foodstuffs particularly protein-aqueous foodstuffs.

The following are examples of the present invention, but the present invention is not limited thereto.

EXAMPLE 1

Gliadin (5 g.) and fat (2 g.) are mixed with 18 ml. of 50% ethanol and the mixture is emulsified. The emulsion is uniformly applied to the surface of a piece of molded raw kamaboko (fish-paste, traditionally used by the Japanese as a foodstuff) which is preliminarily coated to give a smooth glossy surface. The resulting raw kamaboko is then dried in the air for four hours. After drying, a solution of 2 g. of L-alanine in 10 ml. of water is applied to the foodstuff. An emulsified aqueous solution of 5 g. of sodium alginate and 2 g. of fat is applied to the surface of a second piece of molded raw kamaboko which also is preliminarily coated to give a smooth glossy surface. The two pieces of raw kamaboko are baked at a temperature of about 150° C. for 60 min. The baked kamaboko pieces are cooled and allowed to stand exposed to air at room temperature for a week. The alginic acid-coated kamaboko, which is used as a control, is discolored and putrefied on its surface whereas the gliadin-coated kamaboko shows almost no discoloration.

EXAMPLE 2

Example 1 is repeated except that a piece of raw molded kamaboko is applied first with the aqueous solution of L-alanine to the surface and thereafter with the emulsion of said gliadin, thereby the same result as in Example 1 is obtained.

EXAMPLE 3

70 g. of dough after the secondary fermentation is baked at 205° C. for 15 minutes. The baked dough is quickly sprayed with 1 ml. of a 7% solution of zein in 30% aqueous ethanol and then with 1 ml. of a 2% aqueous solution of L-lysine hydrochloride. The treated dough is baked at the same temperature for further 5 minutes.

A second 70 g. of dough to be used as a control is baked at 205° C. for 20 minutes.

The surface of the control bread is blackish whereas the zein-treated bread has a good appearance with smooth, lustrous, yellowish-brown surface and is apparently superior in appearance to the control bread.

The treated bread and untreated bread are allowed to stand at room temperature and the loss in weight caused by vaporization of water is measured. After two days, the control bread loses 15% of its weight whereas the zein-treated bread loses only 5% of its weight.

EXAMPLE 4

A dry product of meat-like vegetable protein is prepared by extruding soybean protein, to which various seasonings, containing liquor are admixed, from a nozzle at a temperature of 130° C. and a pressure of 5 kg./cm.$^2$. Zein, alginic acid and malic acid are dissolved in water in the ratio of 20:5:1 respectively, and the resulting solution is adjusted to a pH of 5.5 with 1N sodium hydroxide solution. The solution is then diluted with water so that the concentration of zein and alginic acid are 20% and 5% respectively. Several pieces of the dry protein product having a weight of 10 g. altogether are first sprayed with 1 ml. of the solution prepared above and then with 0.3 ml. of a 50% aqueous solution of L-lysine, the latter solution having been adjusted to a pH of 7.5 with 50% polyphosphoric acid. The treated pieces of the dried protein product are pressed in a mold and then dried at 110° C. for 60 minutes. A second set of pieces of the dry protein product having a weight of 10 g. altogether, to be used as a control, is sprayed with 1 ml. of an aqueous solution containing 25% sodium alginate and then with 1 ml. of an aqueous solution containing 25% polyphosphoric acid. The sprayed pieces are then dried at 110° C. for 60 minutes.

The samples are immersed in warm water having a temperature of 50° C. to determine their cohesiveness. The control sample breaks up into pieces instantly while the sample treated with zein maintains its shape and is capable of swelling by absorption of water.

EXAMPLE 5

An alkali solution of protein extracted from soybean from which the fat has been removed, is extruded at room temperature from a fiber-molding nozzle into a 10% aqueous solution of phosphoric acid to obtain artificial fibers of protein. The fibrous protein (2 g.) is bundled and bound by immersing it for 5 minutes in 100 ml. of an aqueous alcohol solution containing 5 g. of gliadin and 1 g. of free L-lysine after which it is pressed and dried with a roller capable of being heated from within. As a control, 2 g. samples of the fibrous protein are each immersed for 5 minutes in a 5% aqueous solution of sodium alginate, sodium polyphosphate and sodium caseinate respectively, and subjected to the same roller treatment. The cohesiveness of the products obtained is determined by measuring the tensile strength when the products are stretched in a rectangular direction. The results obtained are as follows:

| Binder: | Tensile strength, (g./cm.$^2$) |
|---|---|
| Gliadin and L-lysine | $31.6 \times 10^2$ |
| Sodium alginate | $1.3 \times 10^2$ |
| Sodium polyphosphate | $2.3 \times 10^2$ |
| Sodium caseinate | $8.7 \times 10^2$ |

EXAMPLE 6

The procedures of Example 1 are repeated except that various prolamins and amino acids or salts thereof shown in the following table are used. The products are allowed to stand exposed to air at room temperature for a week and show neither discoloration nor putrefaction.

| Prolamin: | Amino acids or salts thereof |
|---|---|
| Rice-gliadin | L-lysine hydrochloride. |
| Kafarin | L-lysine hydrochloride. |
| Gliadin | L-arginine. |
| Gliadin | L-histidine hydrochloride. |
| Gliadin | L-histidine. |
| Gliadin | Glycine. |
| Gliadin | L-valine. |
| Gliadin | L-leucine. |
| Gliadin | L-isoleucine. |
| Gliadin | L-serine. |
| Gliadin | L-threonine. |
| Gliadin | L-cysteine. |
| Gliadin | L-methionine. |
| Gliadin | L-phenylalanine. |
| Gliadin | L-tyrosine. |
| Gliadin | L-tryptophan. |
| Gliadin | L-proline. |
| Gliadin | L-hydroxyproline. |
| Gliadin | Monosodium L-aspartate. |
| Gliadin | Monosodium L-glutamate. |

EXAMPLE 7

The procedures of Example 5 are repeated except that various prolamins and amino acids or salts thereof shown in the following table are used. Also shown in the table are the results determined in the same manner as in Example 5.

| Prolamin | Amino acids or salts thereof | Tensile strength (g./cm.²) |
|---|---|---|
| Rice-gliadin | L-lysine hydrochloride | $3.66 \times 10^3$ |
| Kafirin | do | $3.5 \times 10^3$ |
| Gliadin | L-arginine | $3.26 \times 10^3$ |
| Do | L-histidine hydrochloride | $3.5 \times 10^3$ |
| Do | L-histidine | $3.2 \times 10^3$ |
| Do | Glycine | $2.16 \times 10^3$ |
| Do | L-alanine | $2 \times 10^3$ |
| Do | L-valine | $2.32 \times 10^3$ |
| Do | L-leucine | $2.12 \times 10^3$ |
| Do | L-isoleucine | $2.4 \times 10^3$ |
| Do | L-serine | $2 \times 10^3$ |
| Do | L-threonine | $2.34 \times 10^3$ |
| Do | L-cysteine | $2 \times 10^3$ |
| Do | L-methionine | $2.26 \times 10^3$ |
| Do | L-phenylalanine | $2.4 \times 10^3$ |
| Do | L-tyrosine | $2.2 \times 10^3$ |
| Do | L-tryptophan | $2.0 \times 10^3$ |
| Do | L-proline | $2.1 \times 10^3$ |
| Do | L-hydroxyproline | $2.1 \times 10^3$ |
| Do | Monosodium L-aspartate | $2.82 \times 10^3$ |
| Do | Monosodium L-glutamate | $2.94 \times 10^3$ |
| Control: | | |
| I | (Sodium alginate) | $0.17 \times 10$ |
| II | (Sodium polyphosphate) | $0.27 \times 10$ |
| III | (Sodium caseinate) | $0.94 \times 10$ |

What is claimed is:

1. A method of binding granular or fibrous foodstuffs which comprises intimately contacting said foodstuff with a prolamin and an α-amino acid in a carrier; molding and thereafter drying the resultant mixture to form a bound product, said α-amino acid being selected from the group consisting of L-lysine, L-arginine, L-histidine, glycine, L-alanine, L-valine, L-leucine, L-isoleucine, L-serine, L-threonine, L-cysteine, L-methionine, L-phenylalanine, L-tyrosine, L-tryptophan, L-proline, L-hydroxyproline, L-aspartic acid, L-glutamic acid and inorganic and organic acid salts thereof.

2. The method according to claim 1 wherein said carrier is selected from the group consisting of water, aqueous alcohol and organic acids.

3. The method according to claim 1 wherein said prolamin is selected from the group consisting of gliadin, zein, rice-gliadin and kafirin.

4. A processed foodstuff comprising granules or fibers of a foodstuff bound together by a gelation reaction mixture of a prolamin and an α-amino acid or salt thereof, said α-amino acid being selected from the group consisting of L-lysine, L-arginine, L-histidine, glycine, L-alanine, L-valine, L-leucine, L-isoleucine, L-serine, L-threonine, L-cysteine, L-methionine, L-phenylalanine, L-tyrosine, L-tryptophan, L-proline, L-hydroxyproline, L-aspartic acid and L-glutamic acid.

5. A processed foodstuff according to claim 4 wherein said prolamin is selected from the group consisting of gliadin, zein, rice-gliadin and kafirin.

References Cited

UNITED STATES PATENTS

| | | | |
|---|---|---|---|
| 3,032,422 | 5/1962 | Alikonis | 99—166 |
| 2,102,623 | 12/1937 | Hansen | 106—149 |
| 3,100,710 | 8/1963 | Carlin | 99—169 |
| 2,475,133 | 7/1949 | Furter et al. | 99—166 |
| 2,508,477 | 5/1950 | Stievater et al. | 99—166 |
| 2,775,521 | 12/1956 | Mateles et al. | 99—166 |
| 2,791,509 | 5/1957 | Cosler | 99—166 |
| 3,482,998 | 12/1969 | Carroll et al. | 99—14 |
| 2,913,347 | 11/1959 | Pfirrmann | 260—123 |
| 3,343,963 | 9/1967 | Kjelson | 99—14 |
| 3,403,027 | 9/1968 | Page et al. | 99—17 |

OTHER REFERENCES

Jacobs, Chemistry and Tec. of Foods, 2nd edition, 1951, vol. II, pp. 1053–1058.

Winton, Structure and Composition of Foods, 1932, vol. I, pp. 81–85, 214–227.

MORRIS O. WOLK, Primary Examiner

S. MARANTZ, Assistant Examiner

U.S. Cl. X.R.

106—124, 149; 117—164; 260—123; 426—92, 93, 212, 274, 302, 310